United States Patent
Diao et al.

(10) Patent No.: US 10,755,220 B2
(45) Date of Patent: Aug. 25, 2020

(54) SERVICE LEVEL AGREEMENT IMPACT MODELING FOR SERVICE ENGAGEMENT

(71) Applicant: International Business Machines Corporation, Armonk, NY (US)

(72) Inventors: Yixin Diao, White Plains, NY (US); Linh H. Lam, Yorktown Heights, NY (US); David M. Northcutt, Chester, NJ (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 14/216,649

(22) Filed: Mar. 17, 2014

(65) Prior Publication Data

US 2015/0262106 A1    Sep. 17, 2015

(51) Int. Cl.
*G06Q 30/00* (2012.01)
*G06Q 10/06* (2012.01)
*H04L 12/24* (2006.01)

(52) U.S. Cl.
CPC .......... *G06Q 10/06375* (2013.01); *G06Q 10/063114* (2013.01); *G06Q 10/063118* (2013.01); *H04L 41/5074* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 7/20; G06Q 30/06; H04Q 7/20
See application file for complete search history.

(56) References Cited

U.S. PATENT DOCUMENTS

| | | | |
|---|---|---|---|
| 7,296,256 B2 | 11/2007 | Liu | |
| 7,962,358 B1* | 6/2011 | Fernandez | G06Q 10/0631 705/7.23 |
| 8,527,317 B2 | 9/2013 | Haddad | |
| 2005/0086335 A1* | 4/2005 | Liu | G06Q 10/04 709/223 |

(Continued)

FOREIGN PATENT DOCUMENTS

WO    WO 2008136713 A1    11/2008

OTHER PUBLICATIONS

Cuomo et al., An SLA-based broker for cloud infrastructures: Journal of Grid Computing, 2013, vol. 11, Issue 1, pp. 1-25. (Year: 2013).*

(Continued)

*Primary Examiner* — Patricia H Munson
*Assistant Examiner* — Uche Byrd
(74) *Attorney, Agent, or Firm* — Kristofer Haggerty; Otterstedt, Wallace & Kammer, LLP

(57) ABSTRACT

A method for predicting an impact of a service level agreement including collecting workload data and effort data and constructing a cost model for the service level agreement, defining a baseline service parameter corresponding to the code model of the service level agreement, and calibrating the cost model of the service level agreement, by calibrating a workload volume from the workload data and an effort time from the effort data to match the baseline service parameter, to output a service level agreement impact model.

14 Claims, 6 Drawing Sheets

(56) References Cited

U.S. PATENT DOCUMENTS

| | | | | |
|---|---|---|---|---|
| 2007/0083650 | A1* | 4/2007 | Collomb | G06Q 10/04 709/224 |
| 2007/0282692 | A1* | 12/2007 | Bishop | G06Q 10/06 705/26.1 |
| 2008/0103868 | A1* | 5/2008 | Santos | G06Q 10/06 705/7.14 |
| 2009/0180606 | A1* | 7/2009 | Omiya | G06Q 10/04 379/265.05 |
| 2010/0223200 | A1* | 9/2010 | Balson | G06Q 10/10 705/36 R |
| 2014/0025417 | A1* | 1/2014 | Appel | G06Q 10/063114 705/7.15 |
| 2014/0081691 | A1* | 3/2014 | Wendell | G06Q 10/063114 705/7.15 |

OTHER PUBLICATIONS

Yixin Diao, et al., SLA Impact Modeling for Service Engagement, 9th International Conference on Network and Service Management (CNSM), pp. 185-188, Oct. 14-18, 2013, Zurich, Switzerland (Grace Period Disclosure).

* cited by examiner

SERVICE LEVEL AGREEMENT IMPACT MODELING FOR SERVICE ENGAGEMENT

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): YIXIN DIAO, et al., SLA Impact Modeling for Service Engagement, 9th International Conference on Network and Service Management (CNSM), pages 185-188, Oct. 14-18, 2013, Zurich, Switzerland (Grace Period Disclosure).

BACKGROUND

The present disclosure relates to service level agreements, and more particularly to generating models for, and predicting, an impact of a Service Level Agreement (SLA).

Complex service systems involving multiple parties in support of hardware and software requirements of customers are typically governed by an SLA. For example, a company may engage another party to provide a particular information technology (IT) service (e.g., account activation) governed by an SLA. The SLA may contain provisions related to the performance of the system and the costs associated with the service.

In this and other contexts, standardization is desirable from the service provider's perspective. While standard SLAs are designed to reduce service delivery costs, the ability to provide flexible and customized service levels can be important in gaining the customer's business. Quantifying and estimating the impact of non-standard SLAs on the service delivery cost remain a challenging task and rely on a handful of highly skilled service delivery experts.

To provide a systematic approach for SLA driven service delivery cost estimation, the relationships among service level constraints, customer service workload, and service personnel efficiency need to be characterized. Although literature exists using either analytical or simulation based approaches to support SLA based service delivery decision making, it typically requires detailed modeling data that is typically not available during service engagement.

BRIEF SUMMARY

According to an exemplary embodiment of the present disclosure, a method for predicting an impact of a service level agreement includes collecting workload data and effort data and constructing a cost model for the service level agreement, defining a baseline service parameter corresponding to the code model of the service level agreement, and calibrating the cost model of the service level agreement, by calibrating a workload volume from the workload data and an effort time from the effort data to match the baseline service parameter, to output a service level agreement impact model.

According to an exemplary embodiment of the present disclosure, a method for evaluating a service level agreement impact in a service engagement includes building a mixed multi-queue analytical queueing model for a plurality of service classes, extending the mixed multi-queue analytical queueing model to approximate a service delivery environment, and calibrating the mixed multi-queue analytical queueing model using an engagement costing model.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
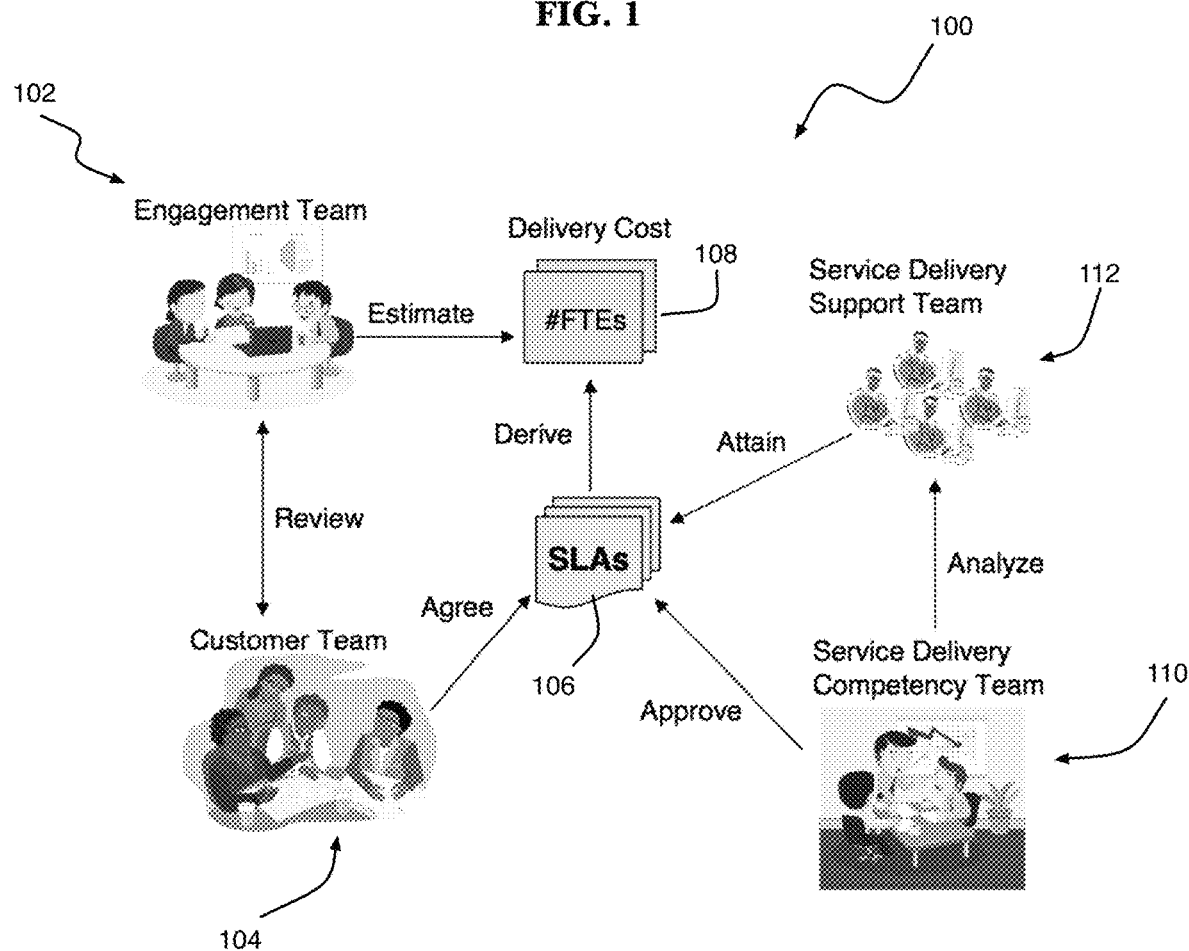
FIG. 1 is a flow diagram of a method for predicting an impact of an SLA according to an exemplary embodiment of the present disclosure.

According to an exemplary embodiment of the present disclosure, a systematic approach for SLA driven cost estimation includes the characterization of relationships among service level constraints, customer service workload, and service personnel efficiency.

Service engagement is one phase in information technology (IT) strategic partnerships in which different parties perform different tasks related to providing a service. During engagement both the scope and the cost of IT services are defined and negotiated between a service customer and a service provider. In order to derive a delivery cost from business requirements, an engagement costing model is used by the service provider (e.g., the service provider's engagement team) to conduct a cost estimation. Although the engagement cost model takes into consideration many delivery factors such as the number of the managed servers and the type of the managing tools, it typically assumes the use of a standard set of Service Level Agreements (SLAs).

According to an exemplary embodiment of the present disclosure, an analytical queueing model (e.g., the Erlang-C model) is described that can be constructed with a limited data requirement, wherein the analytical queueing model is extended through approximation to handle complexities commonly encountered in service delivery. According to an exemplary embodiment of the present disclosure, a model calibration technique integrates with an engagement costing model with a need for complete modeling data. Embodiments of the present disclosure represent a mixed approach that is more practical than a full-scale analytical or simulation based approach, since extensive workload and effort data can be difficult to obtain during the service engagement.

A model according to an exemplary embodiment of the present disclosure can answer many questions in the context of service engagement. Exemplary questions include if a current level of service delivery is sufficient given an expected workload without backlog growth, if the SLA target times are feasible given expected service times, and if the allocated service is sufficient to meet SLA target times. Further what-if analysis can also be implemented to evaluate the SLA and service sensitivity regarding workload and service efficiency changes.

From the business perspective, such a model can provide a systematic method with predictive insight and prescriptive solutions that can be used consistently between engagements. Further, it helps to speed up the engagement teams response time by reducing the time needed to create custom solutions. Moreover, it facilitates SLA negotiation between the service provider and the customer using fact-based models to support cost change justification.

Referring now to service engagement and service delivery, SLA negotiation in service engagement takes place in challenging business environments. For example, many businesses make the decision to focus on a core business and partner with service delivery providers to satisfy IT needs. IT strategic partnerships start from the business (i.e., customer) contracting with a service provider on a menu of IT services such as cloud computing/storage, security patch management, network management, and data backup and restore management. The customer contract specifies the scope of services (e.g., number of servers, number of users), the locations from which services will be provided, and the measures of quality of service (e.g., service level targets). The service delivery provider responds by assigning each contracted service to a delivery location and maintains a team of service agents to respond to the customer's service requests subject to the SLAs.

FIG. 1 illustrates an operational flow 100 of service engagement (before the customer contracts for services) with a focus on service level management. The service provider's engagement team 102 works with a customer team 104 to review the business needs and the services to be provided. Afterwards, the teams document the service level targets in the form of an SLA 106 for agreeing. Furthermore, the engagement team 102 uses the engagement costing model 108 to estimate the delivery cost (e.g., the service cost in term of the number of full time equivalents). The costing model determines a Full Time Equivalent (FTE)/server ratio and addresses a number of delivery factors such as the types of servers, the desired service management activities, the types of the service management tools, and whether they fit into the service provider's standard offerings. The costing model operates based on the assumption of standard SLAs. Due to the complexity of SLA impact estimation, the engagement team typically consults a service delivery competency team 110 to approve non-standard SLAs and corresponding FTE requirements. This is to ensure the agreed level of service is attainable by the service delivery support team 112 during steady state operations.

Referring to SLA modeling for service delivery; after the customer contracts for services and once the customer requests begin to arrive to the service delivery provider, the arrived requests are routed to a service delivery team at a global delivery location. The incoming requests are then assigned to service agents for processing.

Customer service requests can be broadly classified into two types: primary requests and project requests. The primary requests are characterized by relatively short service time (e.g., typically minutes or hours) and short target time (e.g., typically hours or days), and in some cases require a single agent to complete the request. Examples of primary requests include incident tickets, change requests, and maintenance work. The project requests are characterized by requests that are composed of a sequence of tasks and that may require the coordination of a number of service agents responsible for different tasks in the overall project request. Tasks within a project can take weeks or months to complete.

The contract between the customer and the service provider specifies service levels associated with each type of request. Although many types of service level agreements exist, embodiments of the present disclosure are described in the context of an incident resolution time SLA, which is an important SLAs negotiated during service engagement. Embodiments of the present disclosure are not limited to incident resolution time SLA, and can be applied to other SLAs. Another example is the availability SLA, which concerns the quality of IT infrastructure. From the modeling's perspective, the overall service request workload is divided into the incident ticket workload (hereinafter, ticket workload) and the non-ticket workload.

For the ticket workload, incident resolution time SLA form specifies the following terms: (i) scope of agreement, (ii) target time, (iii) percentage attainment, and (iv) time frame over which service will be measured. For example, 95% (percentage attainment) of all severity 1 incident tickets (scope) that are opened over each one-month period (time frame) must be resolved within 3 hours (target time). It should be understood that embodiments of the present disclosure are not limited to the specific incident resolution time SLA form described herein and that other terms can be included.

Referring now to modeling, there are a number of complexities in modeling service delivery centers to balance workload request, service agents, and service level targets. For example, there exists large variability in work volumes, request types, skill requirements, and service times. Further, there is lack of standards in work data recording so that incomplete or inaccuracy data can be common. Moreover, the service level targets are typically defined over a large span of time ranging from hours to weeks. They may also be measured against calendar hours or business hours; in the latter case, a business calendar is needed.

According to an exemplary embodiment of the present disclosure, a modeling framework is constructed for determining an SLA impact while considering the interaction with service workload and delivery effort. The model structure models both ticket workload and non-ticket workload. According to an exemplary embodiment of the present disclosure, an approximation technique is used for handling various complexities encountered in service delivery.

Referring to a model structure, according to an exemplary embodiment of the present disclosure, a model is built based on an Erlang-C model, which expresses a probability that an arriving customer will need to queue before being served. The Erlang-C model captures a nature of service delivery exhibited by multiple servers or service agents and has the closed form solution for tail probabilities. The Erlang-C model has a format configured for gathering data and facilitates model extension.

The Erlang-C formula is known as the M/M/c/∞ or M/M/c queueing model in Kendall notation. An M/M/c model assumes Poisson arrivals, exponential service times, c number of servers, an unlimited number of waiting positions, and first-come first-served queueing discipline. The Erlang-C model has been widely used in telecommunication systems and call center applications. The Erlang-C model determines the number of call center operators needed subject to given call volume and desired waiting time. The Erlang-C model cannot be directly applied to the service delivery applications. This is because of the existence of multiple incident ticket classes, which can be denoted by severity levels (e.g., sev 1, sev 2). Since each severity level has different SLA attainment target, the model needs to be configured for a multiple class queueing problem, instead of the single class problem as addressed by the Erlang-C model. In addition, in some applications non-ticket workload can make up a large portion of the service delivery workload.

Figure 2:
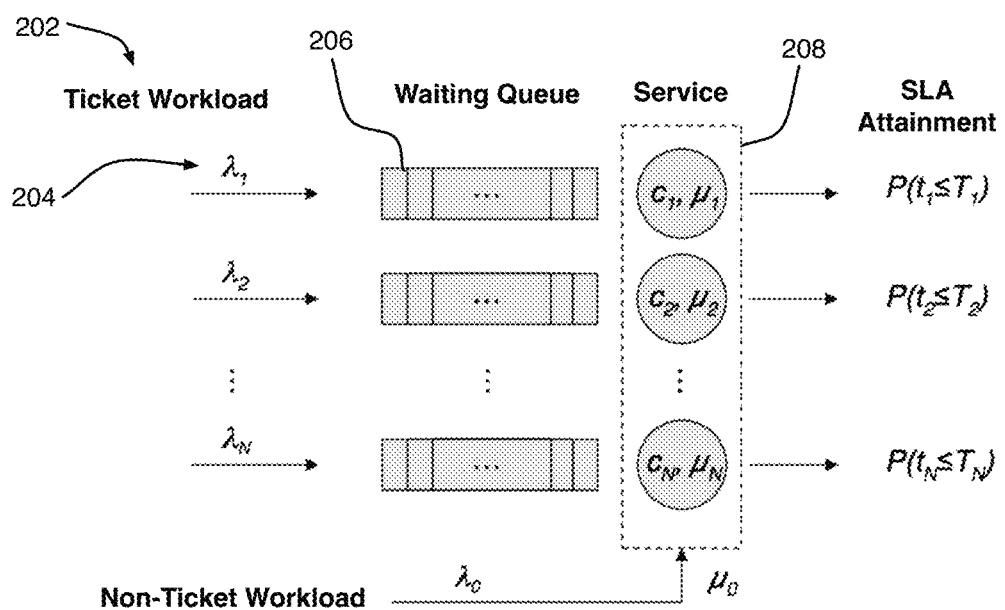
FIG. 2 an SLA impact model according to an exemplary embodiment of the present disclosure.

According to an exemplary embodiment of the present disclosure, a mixed multi-queue Erlang-C model extends the single-queue Erlang-C. As shown in FIG. 2, in one or more embodiments of the present disclosure, the incident ticket workload 202 is divided into multiple sub-workloads, e.g., 204 based on the incident severity classes, where $\lambda_i$ indicates the arrival rate for class i, i=1, 2, ..., N. The per-severity ticket workload enters the corresponding waiting queue, e.g., waiting queue 206, and is serviced by $c_i$ service agents 208 with $\mu$ per-agent service rate, respectively. Given the resolution target time $T_i$, the SLA attainment level for ticket class I is expressed as $P(t_i \le T_i)$, indicating the probability that the ticket resolution time $t_i$ will be less than or equal to the target time $T_i$.

Since each ticket queue is independent of one another, the problem is one of a non-work conserving queueing system; e.g., the service in one queue will be idle when the queue is empty, even if there are tickets waited in other queues to be serviced. In one or more embodiments of the present disclosure, the non-ticket workload (with arrival rate $\lambda_0$ and service rate $\mu_0$) is modeled as additional workload to be serviced by the service agents. Since the non-ticket workload does not have the SLA attainment targets, it will be serviced at a lower priority and in a preemptive way. As such, it will not affect the ticket workload and its SLA attainment calculation, but make the overall queueing system work-conserving.

In one or more embodiments of the present disclosure, the multi-queue separation structure facilitates the use of the Erlang-C formula to determine the per-severity SLA attainment, which can be written as:

$$P(t_i \le T_i) = \frac{c_i - x_i - 1 + C(c_i, x_i)}{c_i - x_i - 1}(1 - e^{-\mu_i T_i}) - \frac{C(c_i, x_i)}{c_i - x_i - 1}(1 - e^{-(c_i - x_i)\mu_i T_i}) \quad (1)$$

$$C(c_i, x_i) = \frac{\frac{x_i^{c_i}}{c_i!}}{\frac{x_i^{c_i}}{c_i!} + \left(1 - \frac{x_i}{c_i}\right)\sum_{k=0}^{c_i-1} \frac{x_i^k}{k!}} \quad (2)$$

where $x_i = \lambda_i/\mu_i$ denotes the traffic intensity and $C(c_i, x)$ denotes the Erlang-C function. Furthermore, to consider the additional workload from the non-ticket work, the following inequality defines the stability condition to be satisfied for maintaining the overall queueing stability:

$$\sum_{i=0}^{N} \frac{\lambda_i}{\mu_i} < \sum_{i=1}^{N} c_i \quad (3)$$

in addition to the per-queue ticket workload stability condition $\lambda_i/\mu_i < c_i$, i=1, 2, ..., N.

According to an exemplary embodiment of the present disclosure, the above mixed multiple queue Erlang-C model simplifies multiple service class modeling. In one or more embodiments of the present disclosure, to apply the model to SLA impact determination, each severity class is considered separately to make sure enough service is provided to satisfy the per-severity SLA attainment requirement. The non-ticket workload is considered and a level of total service is determined sufficient to ensure the overall queueing stability. The maximum service (e.g., level of total service) gives the overall service recommendation subject to the combination of delivery workload and SLA requirement.

Referring now to exemplary approximation techniques according to embodiments of the present disclosure: While the above mixed multi-queue Erlang-C model captures characteristics of service delivery applications, there are a number of delivery complexities that can be considered. These include, for example, workload arrival patterns, a difference between the business hours and calendar hours, and tail probability complexity factors, for which different approximation techniques are used to handle them.

For the workload arrival patterns complexity factor, workload arrival is characterized using weekly arrival patterns to capture the workload variation over the hours of the day and the days of the week. Since the hourly window is used to determine the desired number of operators subject to the corresponding call volume and desired waiting time, this determination subsequently forms the basis to define the operator shift schedules.

In one or more embodiments of the present disclosure, for the mixed multi-queue Erlang-C model, a weekly ticket volume is used as workload input for the SLA impact model. This choice simplifies the data requirement and makes the model more applicable for the service engagement phase. Embodiments of the present disclosure are not limited to weekly determinations and other time periods can be used.

The difference between the business hours and calendar hours is considered by the mixed multi-queue Erlang-C model. This difference happens both on how the SLA target times are defined and on how the service agents work during the week. In one or more embodiments of the present disclosure, to ensure model consistency, the arrival rate and the service agent definition are converted into the same time unit (e.g., business hours or calendar hours). Furthermore, depending on how the SLA is defined, the conversion can be performed differently to better reflect the nature of how service agents work on the tickets.

If the SLA target time is specified in the unit of business hours (denoted by $T_i \in B$), the workload volume is converted into weekly volume per working hour and the service agent count is used directed. That is, $$\begin{cases} \lambda_i = r\lambda_i' \\ c_i = c_i' \end{cases}, T_i \in B \quad (4)$$

where $\lambda_i'$ is the arrival rate defined by calendar hours, $\lambda_i$ is the converted arrival rate to be used in the Erlang-C calculation in Equation (1) and (2), and r denotes the weekly working hour ratio. The measure r=4.48 is derived as 168 calendar hours per week divided by 37.5 working hours per week (i.e., 5 working days with 9 hours per day minus 1.5 hours for lunch and breaks). Regarding the number of service agents $c_i$, it remains the same as the agent head count $c_i'$. This conversion ensures both the arrival rate and the service agent are defined regarding the working hours. For example, if the weekly volume is 168 tickets per week, then $\lambda_i'=1$ (i.e., 1 ticket per hour) and $\lambda_i=4.48$ (i.e., 4.48 tickets per working hour). Since the service rate is always defined in working hours, the number of agents $c_i$ used in Erlang-C calculation reflects the actual head count $c_i'$.

On the other hand, if the SLA target time is defined based on calendar hours (denoted by $T_i \in C$), the workload volume is determined per calendar hour, and the number of service agents is converted to the actual head count using the weekly working hour ratio. That is, $$\left\{\begin{array}{l}\lambda_i = \lambda_i' \\ c_i = \frac{c_i'}{r}\end{array}\right\}, T_i \in C \quad (5)$$

For example, if the weekly volume is still 168 tickets per week (but the SLA is defined per calendar hour), then $\lambda_i = \lambda_i' = 1$ (i.e., 1 ticket per calendar hour) can be used for Erlang-C determination. In this case, the number of agents used in Erlang-C model is defined as working 168 hours per week and are converted to actual head count where $c_i' = rc_i$.

The reason for using the different conversions is that the number of agents needs to be defined in integer. The question is whether to define it at the $c_i$ or $c_i'$ Given the same workload, the above differentiation will yield higher head count numbers when the SLA is defined based on calendar hours than business hours. This is in accordance with the service delivery practice (e.g., the need for on-call support).

Turning to the tail probability complexity factor, while the Erlang-C model assumes Poisson arrivals and exponential service times, the actual tail of probability distribution from the incident tickets tends to be heavier due to unexpected events and delays. Moreover, as common in human operations, the service agents may not always follow the designed queueing discipline such as priority based and earliest deadline first. Instead, they may delay the start of higher priority ticket work in favor of lower priority non-ticket work, for example, in a case where the target time is still far away. This also contributes to a heavier tail that is not exponentially bounded.

According to an exemplary embodiment of the present disclosure, different approaches to approximate the impact from the heavy tail can be used. For example, by adding risk margins to all SLA attainment targets: Instead of taking the face value of the SLA attainment target, a risk margin is added on top of the given target for all severity levels. This gives extra risk tolerance beyond the exponential distribution as assumed by the model. For example, if 1% is used as the risk margin, then a 95% SLA attainment target implies a 96% target in the exponential distribution to be met by the Erlang-C model. In another example, the SLA target time is reduced for low severity classes. Here, a target time reduction ratio is imposed for severity 3 and 4 tickets since their target times are typically quite long. Imposing a reduced target time helps to mimic the impact of "delayed start" as common for low severity tickets. For example, given a 30% reduction, a 10 business hours target time implies 7 business hours for the exponential distribution. The risk margin and reduction ratio are design parameters that can be tuned based on the ticket data to better approximate the heavy tail effect.

In one exemplary usage scenario according to an embodiment of the present disclosure, the SLA impact model is used to estimate the service cost (or delivery FTEs) under different SLA terms. According to embodiments of the present disclosure, the service includes one or more of staffing, bandwidth, processor availability, etc. This estimation process 300 is illustrated in FIG. 3.

Figure 3:
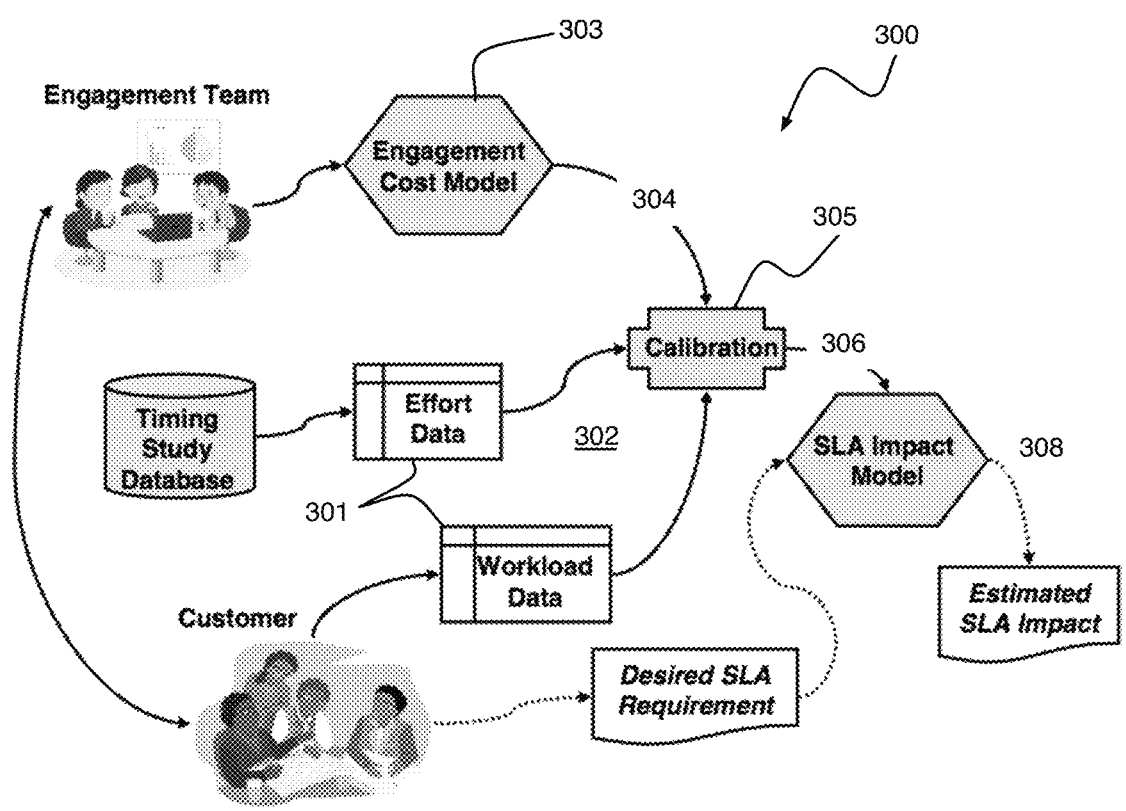
FIG. 3 is a flow diagram of a method for constructing and applying an SLA impact model according to an exemplary embodiment of the present disclosure.

Referring to FIG. 3, at 302 workload and effort data are collected. Workload data and effort data are two sets of data collected for constructing the SLA impact model. The workload data includes both the weekly ticket volume and the percentage breakdown for each severity class. Since no weekly arrival pattern is needed, the above workload data can be derived from the ticketing system, if it is available, or from the monthly ticket report, if that is easier to access during the engagement phase. The effort data defines the actual working time that the service agent spends resolving the ticket. Since the effort data is typically not measured by new customer, it is estimated using the historic effort database containing timing study results from selected existing customers. The estimation is conducted through data interpolation based on the industry and region where the customer belongs to.

At 304 a baseline service is defined. While the SLA impact model quantifies the SLA impact in the queueing-based delivery operation, it does not capture all factors that are used to estimate the service cost. In contrast, the engagement team typically uses the engagement costing model to quantify the impact of various engagement factors but not the impact of different SLAs. To leverage the complementary nature of the two models, the engagement costing model is used to define what the baseline service will be under the standard SLAs.

At 306 the model parameters are calibrated. The SLA impact model is calibrated to ensure that under the standard SLAs the model will give the same service recommendation as the engagement costing model. This is conducted by calibrating the non-ticket workload volume and effort time to match the baseline service as obtained in the previous step. There are several benefits of this calibration step. First, it enriches the SLA impact model by incorporating additional considerations from the engagement costing model. Second, it determines the non-ticket workload volume and effort time which are typically not measured by the customer. Third, it reduces the quality and completeness requirement for the workload and effort data collected at 302.

At 308 an SLA analysis is conducted. This can be a what-if analysis. Once the SLA model has been calibrated based on the baseline service, it can be used to predict the required service agents and therefore the service cost for different SLAs. This will assist service engagement and help to evaluate the impact from various non-standard SLAs that the customer may be interested. The model can also be used to evaluate different what-if scenarios such as increased workload volume or reduced service time (e.g., through productivity improvement), and estimate their impact to meeting the customer's SLA requirement.

Figure 4:
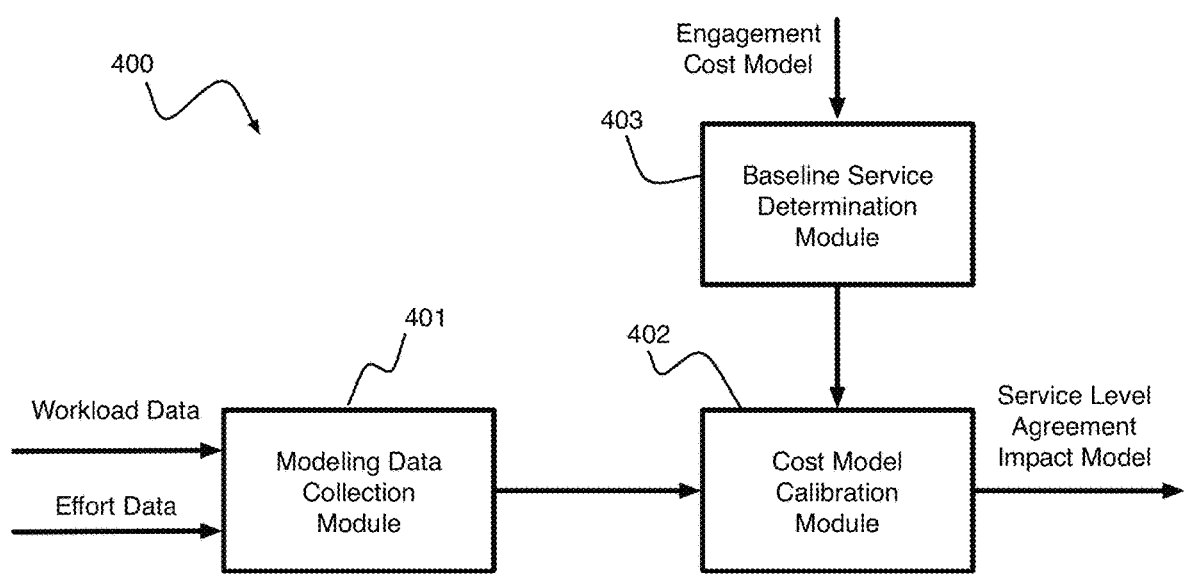
FIG. 4 is a diagram of a system for predicting an impact of an SLA according to an exemplary embodiment of the present disclosure.

Referring to FIG. 4, in a system 400 implementing the calibration process 305 of FIG. 3, a modeling data collection module 401 receives workload data and effort data and outputs workload parameters (e.g., workload volume, severity percentage) and effort parameters (e.g., average and standard deviation of the effort time) to a cost model calibration module 402. The cost model calibration module 402 also receives the service level under an SLA (e.g., a standard or template SLA) from a baseline service determination module 403. The baseline service determination module 403 determines the service level under the SLA from an engagement cost model. The cost model calibration module 402 then outputs the service level agreement impact model.

Figure 5:
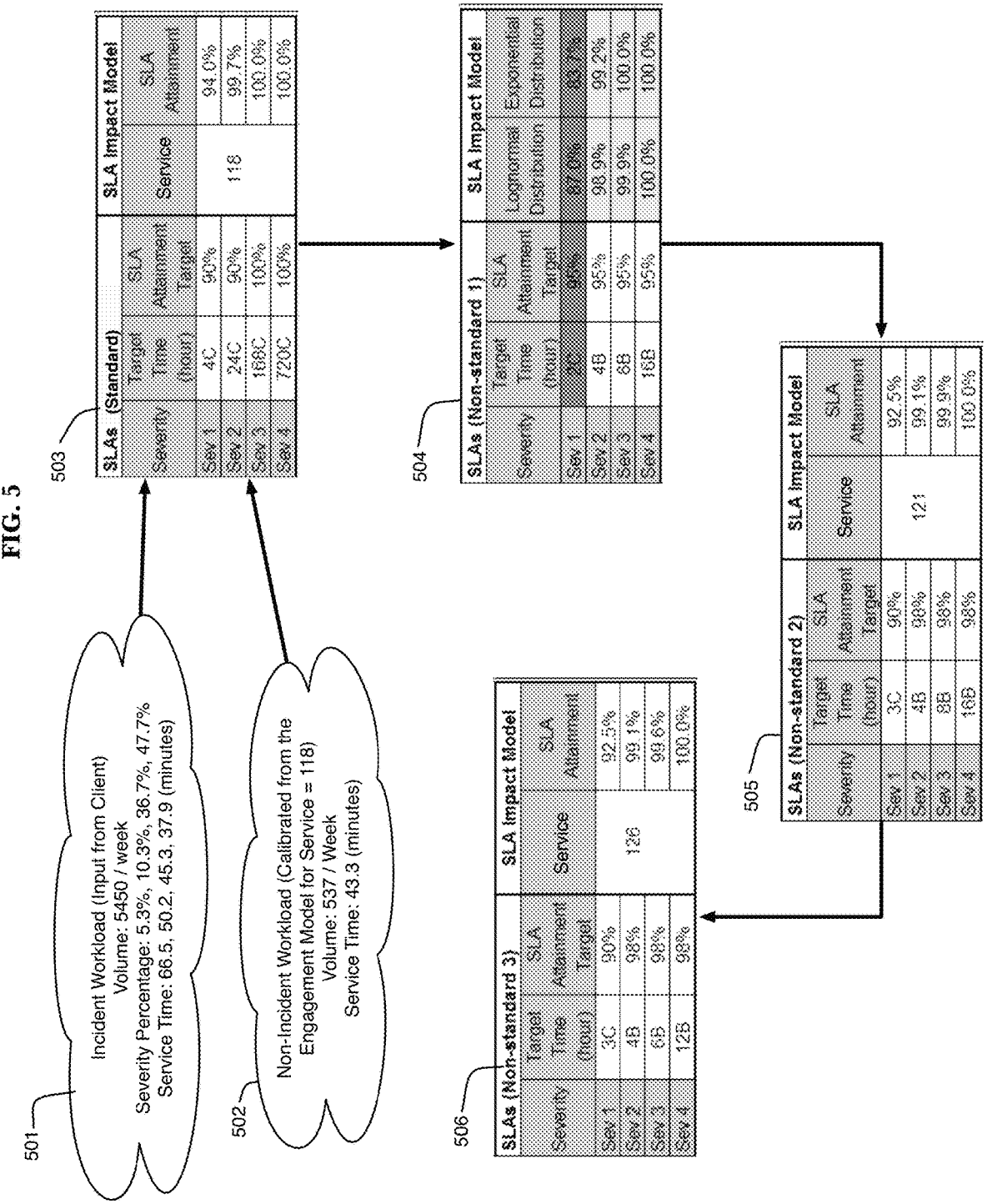
FIG. 5 is a flow diagram of a calibration process for creating an SLA impact model according to an exemplary embodiment of the present disclosure.

Referring now to FIG. 5, one objective of SLA impact modeling is to determine the impact of different SLAs during the service engagement phase and with limited data. The following is an illustrative example that uses an SLA impact model to perform a what-if analysis and explore alternative SLA designs.

Given the workload data 501 and effort data 502. Table I shows the incident ticket workload data collected from the customer (including both the weekly ticket volume and the incident severity percentages) as well as the ticket service time from the historical timing study database.

TABLE I

|  | Sev. 1 | Sev. 2 | Sev. 3 | Sev. 4 |
| --- | --- | --- | --- | --- |
| Severity (Sev.) Percentage (%) | 5.3 | 10.3 | 36.7 | 47.7 |
| Average Service Time (min.) | 66.5 | 50.2 | 45.3 | 37.9 |

To calibrate the SLA impact model, the baseline service (e.g., a staffing level of 118 as shown in Table 503) is acquired from the engagement costing model. Table 503 shows the standard SLAs for the four incident severity levels, and the SLA attainment level achieved by the SLA impact model, subject to the calibrated non-incident workload parameters (i.e., 537 non-ticket work item per week and the average service time is 43.3 minutes).

Given the calibrated SLA impact model, the non-standard SLAs proposed by the customer are evaluated. Prior to service recommendation, the achievability of the SLA targets is evaluated; note that not all non-standard SLAs are accepted since some of them may be infeasible to achieve. For example, as shown in Table 504, the target of 95% attainment for severity 1 SLA tickets (e.g., resolution within 4 calendar hours (4C)) is not achievable. This is because according to the log normal distribution or the exponential distribution of the severity 1 SLA service time, only 87.0% (or 83.7%) of tickets will have the service time that is less than 4 hours. That is, no matter how many service agents are put in the delivery team it is not possible to achieve the 95% target required by the SLA. Table 504 also shows that severity 2, 3, and 4 SLAs are achievable given the expected service times.

In Table 505, the severity 1 SLA is relaxed from 2 calendar hours to 3 calendar hours and from 95% attainment target to 90% attainment target. This yields feasible solution with 121 service agents. Notice that the model suggests tighter attainment targets (as in severity 2, 3, and 4 SLAs) without incurring additional service cost. As shown in Table 506, different SLA alternatives can be further evaluated and discussed until the customer's needs are met.

The proposed SLA impact modeling methodology captures queueing effects from service delivery operations including: (i) stability (the service capacity needs to be larger than the offered workload (including both ticket and non-ticket work)); (ii) theoretical limits (the SLA target time/attainment cannot be stricter than the theoretical limits from service time distribution); and (iii) service impact (considering the above two effects, the tail probability will impact the choice of service when the SLA target is not over relaxed where the stability consideration dominates the service recommendation or over strict where the theoretical limits will reject the SLA proposals).

It should be understood that the methodologies of embodiments of the disclosure may be particularly well-suited for predicting an impact of a service level agreement.

By way of recapitulation, according to an exemplary embodiment of the present disclosure, a method for predicting an impact of a service level agreement includes collecting workload data and effort data and constructing a cost model for the service level agreement, defining a baseline service of the service level agreement, and calibrating the cost model of the service level agreement, by calibrating a workload volume from the workload data and an effort time from the effort data to match the baseline service, to output a service level agreement impact model.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor," "circuit," "module" or "system." Furthermore, embodiments of the present disclosure may take the form of a computer program product embodied in one or more computer readable medium(s) having computer readable program code stored thereon.

Furthermore, it should be noted that any of the methods described herein can include an additional step of providing a system for predicting an impact of a service level agreement (see for example, FIG. 3) and/or a system for determining an SLA impact model (see for example, FIG. 4), comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that collects workload data and effort data and constructing a cost model for the service level agreement (for example, FIG. 3: 301), a second module that defines a baseline service of the service level agreement (see for example, FIG. 3: 303), and a third module that calibrates the cost model of the service level agreement, by calibrating a workload volume from the workload data and an effort time from the effort data to match the baseline service, to output a service level agreement impact model (see for example, FIG. 3: 305). The system shown in FIG. 4 is another non-limiting example including modules configured to perform a calibration process. Further, a computer program product can include a tangible computer-readable recordable storage medium with code adapted to be executed to carry out one or more method steps described herein, including the provision of the system with the distinct software modules.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 6:
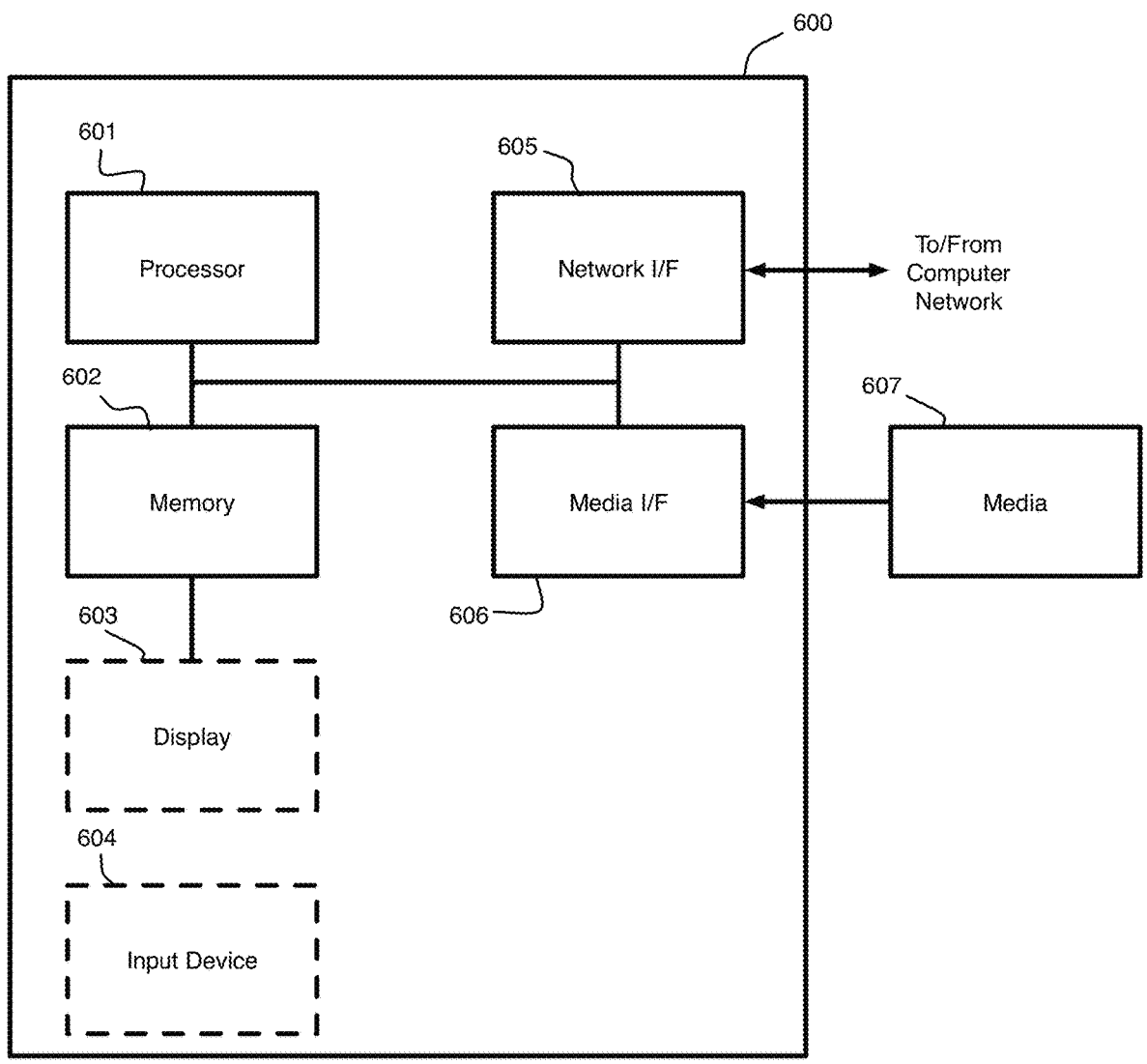
FIG. 6 is a diagram of a system configured to predict an impact of an SLA according to an exemplary embodiment of the present disclosure.

For example, FIG. 6 is a block diagram depicting an exemplary computer system for predicting an impact of a service level agreement according to an embodiment of the present disclosure. The computer system shown in FIG. 6 includes a processor 601, memory 602, display 603, input device 604 (e.g., keyboard), a network interface (I/F) 605, a media IF 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, a software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present disclosure can be implemented as a routine that is stored in memory 602 and executed by the processor 601 to process the signal from the media 607. As such, the computer system is a general-purpose computer system that becomes a specific purpose computer system when executing the routine of the present disclosure.

Although the computer system described in FIG. 6 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method of operating a computer system to coordinate availability of a plurality of processors in a service delivery environment, the method comprising:
   receiving, by the computer system, a ticket workload comprising a plurality of tickets;
   receiving, by the computer system, a non-ticket workload;
   building a mixed multi-queue analytical queueing model comprising a plurality of waiting queues, wherein the mixed multi-queue analytical queuing model is configured to store tickets having a respective ticket severity class i, l=1, 2, . . . , N;
   extending the mixed multi-queue analytical queueing model to approximate the service delivery environment in which a first set of the plurality of processors are made available, wherein an extended mixed multi-queue analytical queueing model includes a resolution target time $T_i$ for resolving a given ticket of the ticket workload for the service delivery environment;

processing, by the computer system, the ticket workload comprising the plurality of tickets by dividing the ticket workload among the plurality of waiting queues according to a respective ticket severity class i of each of the tickets, such that a per-service class ticket workload enters a corresponding one of the waiting queues in the extended mixed multi-queue analytical queueing model, and assigning each of the tickets in the waiting queues to the first set of processors according to the extended mixed multi-queue analytical queueing model on a non-work conserving basis, wherein an empty one of the waiting queues will not accept tickets of a different severity class;

processing, by the first set of processors, the per-service class ticket workload of the waiting queues, wherein the extended mixed multi-queue analytical queueing model outputs an attainment level for each of the waiting queues based on resolutions of the plurality of tickets processed by the first set of processors expressed as a probability P that a ticket resolution time $t_i$ will be less than or equal to the resolution target time $T_i$ according to $P(t_i \leq T_i)$;

modifying a number of the processors available to process tickets from the waiting queues such that the attainment level output by the extended mixed multi-queue analytical queueing model meets an expected attainment level for each of the waiting queues over a given time frame; and processing, by the computer system, the non-ticket workload by assigning the non-ticket workload directly to the plurality of processors on a work-conserving basis.

2. The method of claim 1, wherein building the mixed multi-queue analytical queueing model further comprises combining a plurality of single-queue analytical queueing models, each of which corresponds to one of the ticket severity classes.

3. The method of claim 1, wherein extending the mixed multi-queue analytical queuing model to approximate the service delivery environment further comprises:
determining a plurality of workload arrival patterns for the tickets received in the service delivery environment;
converting measurements of time in the service delivery environment to a same time unit; and
determining one or more tail probability factors for a service level agreement attainment target.

4. The method of claim 3, further comprising specifying the plurality of workload arrival patterns in units of weekly ticket volume.

5. The method of claim 3, wherein converting measurements of time in the service delivery environment to the same time unit further comprises converting a workload arrival rate and working times of the processors currently available in the same time unit.

6. The method of claim 3, wherein determining the one or more tail probability factors comprises:
adding a risk margin to the service level agreement attainment target; and
imposing a reduced target time on the service level agreement attainment target.

7. The method of claim 1, further comprising calibrating the extended mixed multi-queue analytical queueing model using an engagement costing model to output a calibrated extended mixed multi-queue analytical queuing model, wherein the calibration of the mixed multi-queue analytical queuing model ensures that the engagement costing model and the mixed multi-queue analytical queueing model generate a same prediction under a same standard service level agreement.

8. A non-transitory computer program product for operating a computer system to coordinate availability of a plurality of processors in a service delivery environment, the non-transitory computer program product comprising:
a computer readable storage medium having computer readable program code embodied therewith, the computer readable program code comprising:
computer readable program code configured to receive a ticket workload comprising a plurality of tickets;
computer readable program code configured to receive a non-ticket workload;
computer readable program code configured to build a mixed multi-queue analytical queueing model comprising a plurality of waiting queues, wherein the mixed multi-queue analytical queuing model is configured to store tickets having a respective ticket severity class i, $I=1, 2, \ldots, N$;
computer readable program code configured to extend the mixed multi-queue analytical queueing model to approximate the service delivery environment in which a first set of the plurality of processors are made available, wherein an extended mixed multi-queue analytical queueing model includes a resolution target time $T_i$ for resolving a given ticket of the ticket workload for the service delivery environment;
computer readable program code configured to process the ticket workload comprising the plurality of tickets by dividing the ticket workload among the plurality of waiting queues according to a respective ticket severity class i of each of the tickets, such that a per-service class ticket workload enters a corresponding one of the waiting queues in the calibrated extended mixed multi-queue analytical queueing model, and assigning each of the tickets in the waiting queues to the first set of processors according to the calibrated extended mixed multi-queue analytical queuing model on a non-work conserving basis, wherein an empty one of the waiting queues will not accept tickets of a different severity class;
computer readable program code configured to process, by the first set of processors, the per-service class ticket workload of the waiting queues, wherein the extended mixed multi-queue analytical queueing model outputs an attainment level for each of the waiting queues based on resolutions of the plurality of tickets processed by the first set of processors expressed as a probability P that a ticket resolution time $t_i$ will be less than or equal to the resolution target time $T_i$ according to $P(t_i \leq T_i)$;
computer readable program code configured to modify a number of the processors available to process tickets from the waiting queues such that the attainment level output by the extended mixed multi-queue analytical queueing model meets an expected attainment level for each of the waiting queues over a given time frame; and
computer readable program code configured to process the non-ticket workload by assigning the non-ticket workload directly to the plurality of processors on a work-conserving basis.

9. The non-transitory computer program product of claim 8, wherein the computer readable program code configured to build the mixed multi-queue analytical queuing model further comprises computer readable program code configured to combine a plurality of single-queue analytical queuing models, each of which corresponds to one of the ticket severity classes.

10. The non-transitory computer program product of claim 8, wherein the computer readable program code configured to extend the mixed multi-queue analytical queuing model to approximate the service delivery environment further comprises:
   computer readable program code configured to determine a plurality of workload arrival patterns for the tickets received in the service delivery environment;
   computer readable program code configured to convert measurements of time in the service delivery environment to a same time unit; and
   computer readable program code configured to determine one or more tail probability factors for a service level agreement attainment target.

11. The non-transitory computer program product of claim 10, further comprising computer readable program code configured to specify the plurality of workload arrival patterns in units of weekly ticket volume.

12. The non-transitory computer program product of claim 10, wherein the computer readable program code configured to convert measurements of time in the service delivery environment to the same time unit further comprises computer readable program code configured to convert a workload arrival rate and working times of the processors currently available in the same time unit.

13. The non-transitory computer program product of claim 10, wherein the computer readable program code configured to determine the one or more tail probability factors comprises:
   computer readable program code configured to add a risk margin to the service level agreement attainment target; and
   computer readable program code configured to impose a reduced target time on the service level agreement attainment target.

14. The non-transitory computer program product of claim 8, further comprising computer readable program code configured to calibrate the extended mixed multi-queue analytical queueing model using an engagement costing model to output a calibrated extended mixed multi-queue analytical queuing model, wherein the computer readable program code configured to calibrate the mixed multi-queue analytical queuing model ensures that the engagement costing model and the mixed multi-queue analytical queuing model generate a same prediction under a same standard service level agreement.

* * * * *